(12) United States Patent
Nalette et al.

(10) Patent No.: US 6,755,892 B2
(45) Date of Patent: Jun. 29, 2004

(54) CARBON DIOXIDE SCRUBBER FOR FUEL AND GAS EMISSIONS

(75) Inventors: Timothy A. Nalette, West Stafford, CT (US); William Papale, Simsbury, CT (US); Tom Filburn, Granby, CT (US)

(73) Assignee: Hamilton Sundstrand, Windsor Locks, CT (US)

( * ) Notice: Subject to any disclaimer, the term of this patent is extended or adjusted under 35 U.S.C. 154(b) by 92 days.

(21) Appl. No.: 10/050,419

(22) Filed: Jan. 16, 2002

(65) Prior Publication Data

US 2002/0083833 A1 Jul. 4, 2002

Related U.S. Application Data

(63) Continuation-in-part of application No. 09/640,440, filed on Aug. 17, 2000, now Pat. No. 6,364,938.

(51) Int. Cl.[7] .............................................. B01D 53/02
(52) U.S. Cl. ................................ 95/11; 95/97; 95/139; 96/111; 96/130; 96/126
(58) Field of Search ............................... 95/11, 104, 96, 95/97, 139, 900, 148; 96/111, 108, 153, 109, 115, 130, 145, 146, 143, 126; 423/228; 502/402, 401, 417

(56) References Cited

U.S. PATENT DOCUMENTS

| | | | | |
|---|---|---|---|---|
| 2,545,194 | A | * | 3/1951 | Colburn et al. |
| 3,491,031 | A | * | 1/1970 | Stoneburner |
| 3,594,983 | A | * | 7/1971 | Yearout |
| 3,738,084 | A | * | 6/1973 | Simonet et al. |
| 4,005,708 | A | * | 2/1977 | Netteland et al. |
| 4,539,189 | A | * | 9/1985 | Starkston et al. |
| 4,668,255 | A | * | 5/1987 | Govind |
| 4,675,309 | A | | 6/1987 | Hirai et al. |
| 4,810,266 | A | * | 3/1989 | Zinnen et al. |
| 4,822,383 | A | | 4/1989 | Brose et al. |
| 4,999,175 | A | * | 3/1991 | Vansant et al. |
| 5,281,254 | A | * | 1/1994 | Birbara et al. |
| 5,376,614 | A | | 12/1994 | Birbara et al. |
| 5,462,908 | A | * | 10/1995 | Liang et al. |
| 5,492,683 | A | | 2/1996 | Birbara et al. |
| 5,518,626 | A | | 5/1996 | Birbara et al. |
| 5,876,488 | A | * | 3/1999 | Birbara et al. |
| 6,274,108 | B1 | | 8/2001 | Fujii et al. |
| 6,355,094 | B1 | * | 3/2002 | Schomaker et al. |
| 6,364,938 | B1 | * | 4/2002 | Birbara et al. |
| 6,547,854 | B1 | * | 4/2003 | Gray et al. |
| 2002/0083833 | A1 | * | 7/2002 | Nalette et al. |

FOREIGN PATENT DOCUMENTS

| | | |
|---|---|---|
| GB | 1296889 | 11/1972 |
| JP | 63059332 | 3/1988 |
| JP | 02187153 | 7/1990 |

OTHER PUBLICATIONS

European Search Report completed May 12, 2003.

* cited by examiner

Primary Examiner—Duane S. Smith
(74) Attorney, Agent, or Firm—Carlson, Gaskey & Olds

(57) ABSTRACT

A system and method for controlling carbon dioxide ($CO_2$) emissions emanating from a gas source includes a $CO_2$ sorbent bed containing a regenerable sorbent. Exhaust gases flow through the $CO_2$ sorbent bed before being released into the atmosphere. The $CO_2$ sorbent bed traps $CO_2$ contained within the exhaust gas to control the amount of $CO_2$ finally exhausted to the atmosphere. At least two $CO_2$ sorbent beds are used such that while one is absorbing $CO_2$ from the gas stream another is being regenerated. The $CO_2$ sorbent bed is regenerated to release the trapped $CO_2$ for disposal or use in other processes. The $CO_2$ sorbent beds are cycled between absorbing $CO_2$ and regenerating to optimize absorption of $CO_2$.

21 Claims, 2 Drawing Sheets

025 # CARBON DIOXIDE SCRUBBER FOR FUEL AND GAS EMISSIONS

This application is a continuation in part of U.S. patent application Ser. No. 09/640,440 filed on Aug. 17, 2000 now U.S. Pat. No. 6,364,938.

BACKGROUND OF THE INVENTION

This invention relates to a system for minimizing carbon dioxide emissions from a stationary source, and specifically for minimizing carbon dioxide emissions emanating from burning fossil fuels or extracting natural gas.

There is currently a great interest in reducing emissions of carbon dioxide ($CO_2$) gases into the atmosphere. The amount of $CO_2$ gas emitted into the air is cited as a factor contributing to global warming. $CO_2$ gas is emitted whenever fossil fuels are burned, such as in automobile engines and coal burning furnaces used by power plants for the generation of power. Reductions in the amount of $CO_2$ gases emitted by such processes is of increased importance and is a point of specific emphasis for government regulatory agencies. This is especially so for power plants burning large volumes of fossil fuels, emitting large quantities of $CO_2$ into the atmosphere.

Currently systems for controlling and eliminating the $CO_2$ from a breathable air supply are utilized in submarines, space vehicles and space suits. These systems utilize a $CO_2$ sorbent bed composed of a plurality of amine sorbent beads disposed within a container. A stream of air containing $CO_2$ is flowed through the container and the amine sorbent beads. The $CO_2$ contacting the amine sorbent beads reacts therewith to become trapped within the container. The remainder of the breathable air recirculates into the controlled environment. Once the container has become saturated with $CO_2$ such that further absorption of $CO_2$ is inefficient, the breathable air stream is switched to a second container. The saturated container is then exposed to heat or reduced pressure to evolve or release the trapped $CO_2$ for disposal or use in other systems. Such systems have proven effective and efficient for controlling $CO_2$ content within enclosed environments, however this technology has not been applied to environments such as those encountered in the operation of a power plant or the extraction of natural gas.

It is therefore desirable to employ technology associated with controlling $CO_2$ in enclosed environments to control exhaust emissions associated with burning of fossil fuels and extraction of natural gas.

SUMMARY OF THE INVENTION

A disclosed embodiment of this invention is a system and method for controlling carbon dioxide ($CO_2$) emissions emanating from a gas source using sorbent beds containing a regenerable sorbent.

The system controls $CO_2$ emissions formed from the burning of coal or natural gas by absorbing $CO_2$ from a gas stream. The system is installed such that exhaust gases are communicated through a $CO_2$ sorbent bed before being released into the atmosphere. The $CO_2$ sorbent bed traps $CO_2$ contained within the exhaust gas such that the now $CO_2$ minimized gas is finally exhausted to the atmosphere. Another embodiment of this invention is installed to control $CO_2$ content within natural gas extracted from a well. The gas extracted from the natural gas well is routed through the $CO_2$ sorbent beds of this invention to control the amount of $CO_2$ contained within the final product.

The system includes at least two sorbent beds with one operably associated with the exhaust gas stream. The particular sorbent bed communicates with the exhaust gas stream by way of an inlet conduit and inlet valve. The inlet valve directs the exhaust gas stream through the sorbent bed such that $CO_2$ is absorbed and trapped. The outlet valves direct gas out of the sorbent bed. While one sorbent bed absorbs $CO_2$, another sorbent bed is being regenerated to release trapped $CO_2$ into a storage container for disposal or use in other processes.

Applying heat above a predetermined temperature to release trapped $CO_2$ regenerates the sorbent bed. A vacuum source is in operable communication with the regenerating $CO_2$ sorbent bed to draw the released $CO_2$ out of the sorbent bed. Alternatively, a steam source is introduced through a steam inlet valve to heat the sorbent bed and release $CO_2$. Steam heats the sorbent bed above the predetermined temperature to cause the release of $CO_2$ from the sorbent bed and concurrently drive the $CO_2$ out through the outlet valve.

A controller governs actuation of the heat source and of the vacuum source. The controller is also in communication with the inlet valve and the outlet valve to switch which sorbent bed, the gas stream flows. The controller alternates flow of the gas stream between the sorbent beds, such that one of the sorbent beds is always regenerating, while another sorbent bed is in communication with the gas stream.

A cooler is in operable communication with the sorbent bed that is currently in communication with the gas stream to regulate temperatures within the sorbent bed. Absorption of $CO_2$ generates a great deal of heat, and the sorbent bed works most efficiently at cooler temperatures. The cooler is actuated in response to signals from the controller to maintain a desired optimal temperature for the sorbent bed.

The sorbent beds include a regenerable $CO_2$ sorbent. Regenerable $CO_2$ sorbents are capable of repeatedly trapping and releasing $CO_2$ for many cycles and are therefore desirable for $CO_2$ removal applications including exhaust gases exhausted from a smoke stack. Preferably, the sorbent is an amine sorbent applied to a support structure to form a plurality of amine sorbent beads. The amine sorbent beads are packed into each sorbent bed to contact the gas steam.

In operation, the controller of the system actuates the inlet and outlet valves to direct the gas stream through at least one of the sorbent beds. The sorbent disposed within the sorbent bed forms a loose molecular bond with the $CO_2$ to trap the $CO_2$ within the sorbent bed. The remaining gas is directed out of the sorbent bed either to a storage tank or through a smokestack. The controller actuates the cooler to govern the temperature of the sorbent bed in contact with the gas stream to maintain an optimal temperature.

The $CO_2$ sorbent bed is placed within the gas stream, for a predetermined duration calculated to optimize $CO_2$ absorption. The controller will then actuate the inlet and outlet valves to divert the gas steam to another sorbent bed. The $CO_2$ saturated sorbent bed is then regenerated in preparation for another absorption cycle.

The system and method of this invention employs technology for controlling $CO_2$ in enclosed environments to control exhaust emissions associated with burning of fossil fuels and with natural gas production.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
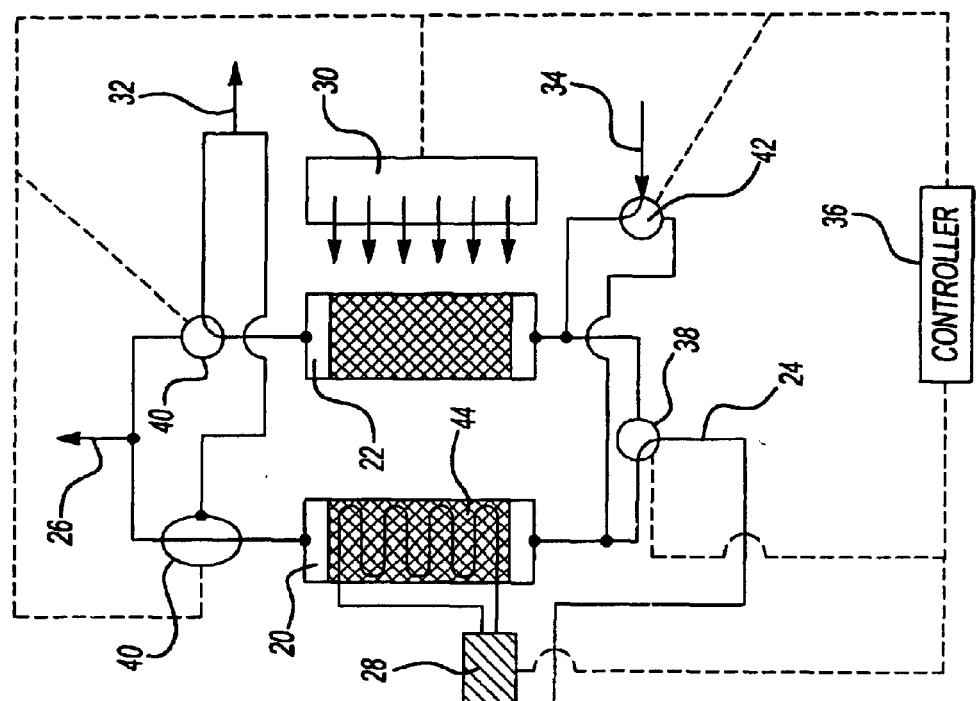
FIG. 1 is a schematic drawing of a system installed to a power plant producing $CO_2$ by burning fossil fuels.
Figure 1:
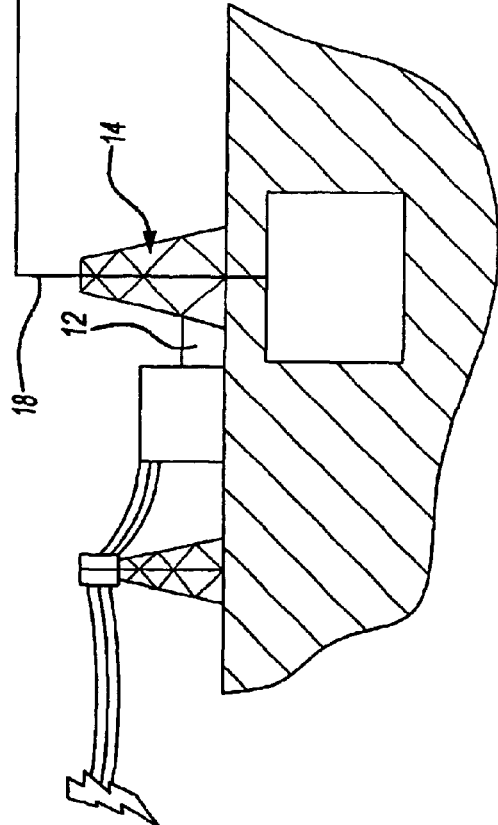

Referring to FIG. 1, a disclosed embodiment of this invention is a system and method for controlling carbon dioxide ($CO_2$) emissions from a gas source. The system 10 is schematically shown in FIG. 1 installed to control $CO_2$ emissions formed from the burning of coal or natural gas by a power plant 12 to generate electrical energy. The waste gases produced from burning of coal or natural gas are directed through an exhaust stack 14 and then out to the atmosphere. The system 10 is installed such that exhaust gases, indicated at 18, are communicated through a $CO_2$ sorbent bed 20 before being released into the atmosphere. The $CO_2$ sorbent bed 20 traps $CO_2$ contained within the exhaust gas 18 such that the now $CO_2$ minimized gas is finally exhausted to the atmosphere through a conduit 26.

The system 10 includes at least two sorbent beds 20, 22 with only one operably associated with the exhaust gas stream 18 at any one time. The particular sorbent bed 20, 22 communicates with the exhaust gas stream 18 by way of inlet conduit 24 and inlet valve 38. The inlet valve 38 directs the exhaust gas stream 18 through the sorbent bed 20 such that $CO_2$ is absorbed and trapped. The outlet valves 40 direct the flow out of the sorbent bed 20 to a second conduit 26 into the atmosphere.

While one sorbent bed 20 is absorbing $CO_2$, a second sorbent bed 22 is being regenerated. Regeneration of the sorbent bed releases the trapped $CO_2$ into a storage container for disposal or use in other processes. Although two sorbent beds 20, 22 are illustrated, it is within the contemplation of this invention to use any number of sorbent beds 20, 22 as may be required based on the specific application.

The sorbent bed 22 is regenerated by applying heat by way of a heat source 30. The sorbent bed 22 is configured such that trapped $CO_2$ is released above a predetermined temperature. The heat source 30 is schematically illustrated and maybe of any kind known to a worker skilled in the art. The heat source 30 applies heat to the sorbent bed 22 to elevate the temperature above the predetermined temperature to release $CO_2$. A vacuum source 32 is in operable communication with the sorbent bed 22 to draw the released $CO_2$ from the sorbent bed 22 out to a storages or distribution source. Regeneration may also be accomplished through the application of reduced pressures, such as the vacuum without the application of heat.

Alternatively, a steam source 34 is introduced through steam inlet valve 42 to heat the sorbent bed 22 and release $CO_2$. Steam from the steam source 34 heats the sorbent bed 22 above the predetermined temperature to cause the release of $CO_2$ from the sorbent bed 22. The regeneration method employed may include one or a combination of heat, vacuum and steam. The specific configuration for regeneration of the sorbent beds 20, 22 is adaptable for each specific application.

A controller 36 governs actuation of the heat source 30 and of the vacuum source 32. The controller 36 is also in communication with the inlet valve 38 and the outlet valve 40 to switch which sorbent bed 20, 22 the gas stream 18 flows. The controller 36 alternates flow of the gas stream 18 between the sorbent beds 20, 22 such that one of the sorbent beds 20, 22 is always regenerating, while one of the sorbent beds 20, 22 is always in communication with the gas stream 18.

In one embodiment of the system 10, a cooler 28 is in operable communication with the sorbent bed 20 that is currently in communication with the gas stream 18 to regulate temperatures within the sorbent bed 20. Absorption of $CO_2$ generates a great deal of heat, and the sorbent bed works most efficiently at cooler temperatures. The cooler 28 is actuated in response to signals from the controller to maintain a desired optimal temperature of the sorbent bed 20. The optimal temperature of the sorbent bed 20 is determined for each specific configuration of sorbent bed in relation to differences in size, type of sorbent, and characteristics of the gas stream 18.

Figure 2:
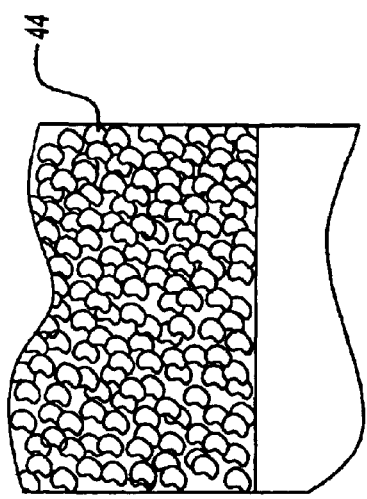
FIG. 2, is a schematic drawing of sorbent beads within a sorbent bed.

Referring to FIGS. 1 and 2, preferably, each of the sorbent beds 20, 22 includes a regenerable $CO_2$ sorbent. Regenerable $CO_2$ sorbents are capable of repeatedly trapping and releasing $CO_2$ for many cycles and are therefore desirable for $CO_2$ removal applications including exhaust gases through a smoke stack. Preferably, the sorbent is an amine sorbent applied to a support structure to form a plurality of amine sorbent beads indicated at 44. The support structure maybe formed from a polymeric material, an activated charcoal material, an alumina material, or any other porous material as is known to a worker knowledgeable in the art. The amine sorbent beads 44 are packed into each sorbent bed 44 to contact the gas steam 18.

Preferably, the sorbent is composed of predominantly secondary amines and one or more nitrile functional groups. The preferred sorbent is a reaction product of tetraethylenepentamine (TEPA) and acrylonitrile (AN). The reaction of TEPA with AN converts the primary amines contained in TEPA to secondary amines. The conversion of the primary amines to secondary amines enhances the $CO_2$ sorption capacities relative to other sorbents along with reducing amine volatility. One reaction product of TEPA and AN, referred to as TEPAN is a reaction resulting from the combination of 1.0 mole of TEPA and 3 moles of AN to form the branched acrylic form of TEPAN shown below:

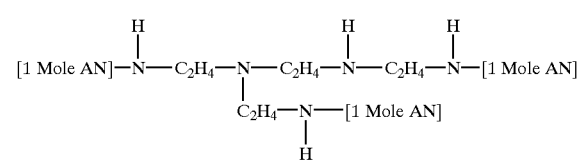

Another reaction product of TEPA and AN results from the combination of 1.0 mole of TEPA and 2 moles of AN. This reaction forms the non-branched acrylic form shown below.

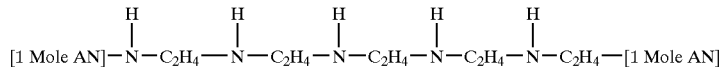

The use of TEPAN is not preferably used for applications were steam is used to regenerate the sorbent bed. In addition, although, the use of TEPAN as the sorbent is disclosed, it is within the contemplation of this invention to use other types of sorbents as would be known to a persons skilled in the art. Such a sorbent includes a sorbent known in the art as a solid weak base ionic exchange resin with preferred amine functionality. This type of sorbent includes amines possessing characteristics of high $CO_2$ absorption.

The particular sorbent composing each of the $CO_2$ sorbent beds 20, 22 is selected with regard to many application specific factors. The factors include and are not limited to, the content of the exhaust gas flowing through each of the sorbent beds 20, 22 along with the temperature of the exhaust gas stream 18. In addition, the type of regeneration system used will govern which type of sorbent selected for a specific application. For example, a system using a steam source 34 requires the use of a different type of sorbent as a sorbent using heat and vacuum to release $CO_2$ from the sorbent bed 20, 22.

Figure 3:
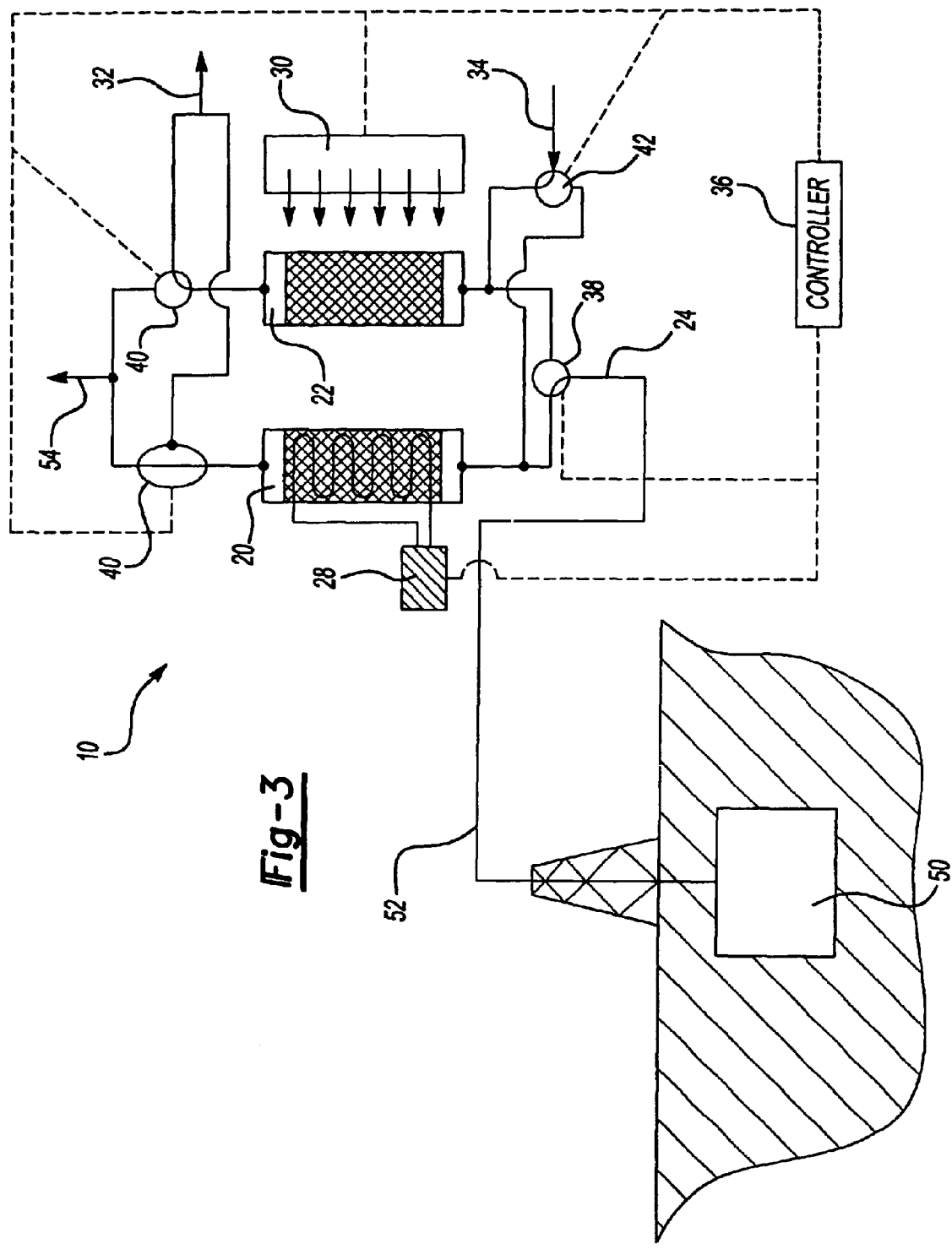
FIG. 3 is a schematic drawing of another embodiment of the system installed to a well extracting natural gas containing $CO_2$.

Referring to FIG. 3, another embodiment of the system 10 is in communication with a natural gas stream 52 emanating from a natural gas well 50. The natural gas stream 52 includes a mixture of Methane and $CO_2$ routed through the sorbent bed 20 to remove the $CO_2$ and forward the remaining gas out to a supply line indicated at 54. The system 10 includes at least two sorbent beds 20, 22 that are cycled into and out of the gas stream extracted from the natural gas well 50. This system 10 operates much like the embodiment shown in FIG. 1, except that the exhaust gases flowing through the conduit 54 are the end product of the operation.

Referring to FIGS. 1 and 3, in operation, the controller 36 of the system 10 actuates the inlet valve 38 and the outlet valves 40 to direct the flow of gas 18, 52 through at least one of the sorbent beds 20, 22. The sorbent beads 44 disposed within the sorbent bed 20 form loose molecular bonds with the $CO_2$, thereby trapping the $CO_2$.

The remaining gas is directed out of the sorbent bed 20 either to a storage tank as indicated at 54 in FIG. 3, or through a smoke stack as indicated at 26 in FIG. 1. The controller 36 actuates the cooler 28 to govern the temperature of the sorbent bed 20 in contact with the gas stream 18, 52 to maintain an optimal temperature. Absorbing $CO_2$ generates heat, and the amount of $CO_2$ absorbed by the $CO_2$ sorbent bed 20, 22 is proportional to the temperature such that the cooler the sorbent bed 20, the more $CO_2$ that may be absorbed. The $CO_2$ sorbent bed 20 is placed within the gas stream 18, 52 for a predetermine duration calculated to optimize $CO_2$ absorption between regeneration cycles. The controller 36 will then actuate the inlet 36 and outlet valves 40 to divert the gas steam 18, 52 to another sorbent bed 20, 22.

Regeneration of the sorbent bed 20, 22 occurs by the application of heat to release the bond with the $CO_2$. Heat can be applied by a heat source 30 or by a steam source 34. A vacuum may be applied with any means of applying heat to the sorbent bed 20, 22 such that the released $CO_2$ can be drawn from the sorbent bed 22, 20 and routed to a storage or disposal location. The controller 36 will govern the duration of time that heat is applied to desorb, or regenerate the sorbent beds 20, 22. The duration of time will depend on application specific factors such as the amount of sorbent beads 44 and the size of the sorbent beds 20, 22. The releaser of $CO_2$ prepares the sorbent bed 20, 22 for a subsequent absorption cycle.

The foregoing description is exemplary and not just a material specification. The invention has been described in an illustrative manner, and should be understood that the terminology used is intended to be in the nature of words of description rather than of limitation. Many modifications and variations of the present invention are possible in light of the above teachings. The preferred embodiments of this invention have been disclosed, however, one of ordinary skill in the art would recognize that certain modifications are within the scope of this invention. It is understood that within the scope of the appended claims, the invention may be practiced otherwise than as specifically described. For that reason the following claims should be studied to determine the true scope and content of this invention.

What is claimed is:

1. A system of removing carbon dioxide ($CO_2$) from a gas stream produced in energy extracting systems comprising:
   a $CO_2$ sorbent bed containing an amine/nitrile $CO_2$ sorbent, wherein a major portion of the amine portion of said sorbent is formed from secondary amine groups, and at least one functional nitrile group;
   a conduit for communicating a source of gas containing $CO_2$ with said sorbent bed,
   a conduit for communicating said sorbent bed with an outlet,
   a regeneration device for evolving $CO_2$ from said $CO_2$ sorbent bed, and
   at least one valve disposed to control a flow of said gas into and out of said sorbent bed, wherein said gas stream is produced by burning of fossil fuels.

2. The system of claim 1, wherein said sorbent includes an amine constituent which is composed of at least 60% secondary amine groups, no more than 10% primary amino groups, and no more tan 20% tertiary amine groups.

3. The system of claim 1, wherein there are a plurality of functional nitrile groups in said sorbent.

4. The system of claim 1, wherein said sorbent is a solid weak base ionic exchange resin.

5. The system of claim 1, wherein said sorbent bed includes a plurality of amine sorbent beads, said amine sorbent beads react with said $CO_2$ to trap said $CO_2$ within said sorbent bed.

6. The system of claim 1, including a plurality of said sorbent beds and at least one of said valves operates to switch said flow of gas between said plurality of sorbent beds such that upon saturation of one of said plurality of sorbent beds another non-saturated sorbent bed is placed in communication with said flow of gas.

7. The system of claim 1, wherein said regenerative device includes a heater to heat said sorbent bed to temperatures sufficient to evolve said $CO_2$.

8. A system of removing carbon dioxide ($CO_2$) from a gas stream produced in energy extracting systems comprising:
   a $CO_2$ sorbent bed containing an amine/nitrile $CO_2$ sorbent, wherein a major portion of the amine portion of said sorbent is formed from secondary amine groups and at least one functional nitrile group;

a conduit for communicating a source of gas containing $CO_2$ with said sorbent bed, a conduit for communicating said sorbent bed with an outlet, a regeneration device for evolving $CO_2$ from said $CO_2$ sorbent bed, said regenerative device includes a steam source, said steam source emitting steam into said sorbent bed to drive absorbed $CO_2$ from said sorbent bed; and at least one valve disposed to control a flow of said gas into and out of said sorbent bed.

9. The system of claim 1, wherein said regenerative device includes a vacuum source to draw said evolved $CO_2$ from said sorbent beds.

10. The system of claim 1, including a controller to coordinate operation of said regenerative device and said at least one valve.

11. A system of removing carbon dioxide ($CO_2$) from a gas produced in energy extracting systems comprising:

a $CO_2$ sorbent bed containing an amine/nitrile $CO_2$ sorbent, wherein a major portion of the amine portion of said sorbent is formed from secondary amine groups, and at least one functional nitrile group;

a conduit for communicating a source of gas containing $CO_2$ with said sorbent bed, a conduit for communicating said sorbent bed with an outlet, a regeneration device for evolving $CO_2$ from said $CO_2$ sorbent bed, and at least one valve disposed to control a flow of said gas stream into and out of said sorbent bed, wherein said gas stream emanates from a natural gas well.

12. A system of removing carbon dioxide ($CO_2$) from a gas stream produced in energy extracting systems comprising:

a $CO_2$ sorbent bed containing an amine/nitrile $CO_2$ sorbent, wherein a major portion of the amine portion of said sorbent is formed from secondary amine groups, and at least one functional nitrile group;

a conduit for communicating a source of gas containing $CO_2$ with said sorbent bed, a conduit for communicating said sorbent bed with an outlet, a regeneration device for evolving $CO_2$ from said $CO_2$ sorbent bed, at least one valve disposed to control a flow of said gas into and out of said sorbent bed; and a cooling system operably associated with said sorbent bed to maintain a predetermined temperature within said sorbent bed during absorption of said $CO_2$.

13. A system of removing carbon dioxide ($CO_2$) from a gas stream produced in energy extracting systems comprising:

a $CO_2$ sorbent bed containing an amine/nitrile $CO_2$ sorbent, wherein a major portion of the amine portion of said sorbent is formed from secondary amine groups, and at least one functional nitrile group;

a conduit for communicating a source of gas containing $CO_2$ with said sorbent bed, a conduit for communicating said sorbent bed with an outlet, a regeneration device for evolving $CO_2$ from said $CO_2$ sorbent bed;

at least one valve disposed to control a flow of said gas into and out of said sorbent bed; and a storage tank in operable communication with said sorbent bed and controlled by said at least one valve such that $CO_2$ evolved from said sorbent bed is drawn into said storage tank.

14. The system of claim 1, further including an exhaust conduit operably associated with said sorbent bed to carry away evolved $CO_2$.

15. A method for removing carbon dioxide ($CO_2$) from a gas containing $CO_2$ extracted from an energy producing system, said method including the steps of:

a. communicating a at least two $CO_2$ sorbent beds containing an amine/nitrile $CO_2$ sorbert, wherein a major portion of the amine portion of said sorbent is formed from secondary amine groups, and at least one functional nitrile group with the gas containing $CO_2$ by placing one of said two sorbert beds within the flow of gas until reaching the predetermined concentration of $CO_2$;

b. absorbing $CO_2$ contained within the gas with the sorbent bed;

c. concentrating said $CO_2$ within said sorbent bed, and d. expelling said $CO_2$ from said sorbent bed upon reaching a predetermined concentration level of $CO_2$ by applying steam at a temperature above a predetermined temperature to release said $CO_2$ from said sorbent bed.

16. The method of claim 15, further including the step of switching the flow of gas from one of said at least two sorbent beds upon one of said at least two sorbent beds reaches said predetermined concentration of $CO_2$.

17. The method of claim 15, wherein said step (d) is further defined by expelling $CO_2$ from said sorbert bed at the predetermined concentration of $CO_2$.

18. The method of claim 15, wherein said step (d) is further defined by raising a temperature of said sorbent bed above a predetermined temperature to release the $CO_2$ from said sorbent bed.

19. The method of claim 15, wherein said step (d) is further defined by applying a vacuum to draw the expelled $CO_2$ out of the sorbert bed.

20. The method of claim 15, wherein said sorbent bed includes a plurality of amine sorbent beads.

21. The method of claim 15, further including switching between said at least two sorbent beds at a predetermined time interval determined to optimize concentration of said $CO_2$ within said sorbent bed.

* * * * *

UNITED STATES PATENT AND TRADEMARK OFFICE
CERTIFICATE OF CORRECTION

PATENT NO. : 6,755,892 B2
DATED : June 29, 2004
INVENTOR(S) : Nalette et al.

It is certified that error appears in the above-identified patent and that said Letters Patent is hereby corrected as shown below:

<u>Column 6,</u>
Line 44, "amino" should read as -- amine --
Line 45, "tan" should read as -- than --

Signed and Sealed this

Twenty-first Day of December, 2004

JON W. DUDAS
*Director of the United States Patent and Trademark Office*